US010387788B2

(12) United States Patent
Zhu et al.

(10) Patent No.: US 10,387,788 B2
(45) Date of Patent: Aug. 20, 2019

(54) GRAPH BASED TECHNIQUES FOR PREDICTING RESULTS

(71) Applicant: Microsoft Technology Licensing, LLC, Redmond, WA (US)

(72) Inventors: Qiang Zhu, Sunnyvale, CA (US); John Chao, Foster City, CA (US); Qingbo Hu, Chicago, IL (US)

(73) Assignee: LinkedIn Corporation, Mountain View, CA (US)

( * ) Notice: Subject to any disclaimer, the term of this patent is extended or adjusted under 35 U.S.C. 154(b) by 724 days.

(21) Appl. No.: 15/046,708

(22) Filed: Feb. 18, 2016

(65) Prior Publication Data

US 2017/0243127 A1  Aug. 24, 2017

(51) Int. Cl.
*G06N 7/00* (2006.01)
*G06F 9/50* (2006.01)
*G06F 9/448* (2018.01)

(52) U.S. Cl.
CPC ........... *G06N 7/005* (2013.01); *G06F 9/4494* (2018.02); *G06F 9/5011* (2013.01)

(58) Field of Classification Search
CPC combination set(s) only.
See application file for complete search history.

(56) References Cited

U.S. PATENT DOCUMENTS

| 7,640,521 | B2 * | 12/2009 | Zhu ..................... G06F 17/5022 703/18 |
| 8,320,672 | B2 * | 11/2012 | Nielsen .............. G06K 9/00664 382/173 |
| 8,736,612 | B1 * | 5/2014 | Goldman ............... G06Q 50/01 345/440 |
| 8,773,437 | B1 * | 7/2014 | Goldman ............... G06Q 50/01 345/440 |
| 10,037,359 | B2 * | 7/2018 | Tague .................... H04L 67/306 |
| 10,264,048 | B2 * | 4/2019 | Zhu ......................... H04L 67/02 |

(Continued)

OTHER PUBLICATIONS

IEEE DEX: A high-performance graph database management system Norbert Martínez-Bazan; Sergio Gómez-Villamor; Francesc Escalé-Claveras Published in: 2011 IEEE 27th International Conference on Data Engineering Workshops pp. 1-4 IEEE.*

(Continued)

*Primary Examiner* — Michael B Holmes
(74) *Attorney, Agent, or Firm* — Hickman Palermo Becker Bingham LLP

(57) ABSTRACT

Techniques are provided for determining predicted results for entities based on relatedness of the entities in a graph of nodes. In an embodiment, the graph of nodes is generated based on the determined relatedness of the entities. A node in the graph of nodes represents an entity, and nodes representing entities with known results are assigned those results as their respective node values. The assigned node values are then propagated between the neighboring nodes throughout the graph of nodes in the amount determined by the relatedness of the nodes. Based on the propagation, node values for entities with unknown results are determined and represent the predicted results for those entities. Additionally, various classifiers may be combined with the propagated node values to increase the accuracy of the predicted results.

26 Claims, 8 Drawing Sheets

(56) References Cited

U.S. PATENT DOCUMENTS

| | | | | |
|---|---|---|---|---|
| 2007/0106490 A1* | 5/2007 | Zhu | ................... | G06F 17/5022 |
| | | | | 703/22 |
| 2016/0353256 A1* | 12/2016 | Chao | ...................... | H04W 4/08 |
| 2017/0243127 A1* | 8/2017 | Zhu | ....................... | G06N 7/005 |
| 2017/0308806 A1* | 10/2017 | Chao | ................... | G06N 99/005 |
| 2017/0308913 A1* | 10/2017 | Chao | ..................... | G06Q 50/01 |
| 2017/0337247 A1* | 11/2017 | Tague | .............. | G06F 17/30528 |

OTHER PUBLICATIONS

IEEE Ranking outlier nodes in subspaces of attributed graphs Emmanuel Müller; Patricia Iglesias Sánchez; Yvonne Mülle; Klemens Böhm Published in: 2013 IEEE 29th International Conference on Data Engineering Workshops (ICDEW) Date of Conference: Apr. 8-12, 2013 pp. 1-7.*

\* cited by examiner

US 10,387,788 B2

GRAPH BASED TECHNIQUES FOR PREDICTING RESULTS

TECHNICAL FIELD

The present disclosure generally relates to improvement of data processing in computer systems and, more specifically, to graph based techniques for predicting results. SUGGESTED ART UNITS: 2129, 2161; SUGGESTED CLASSIFICATIONS: 706/12, 707/749.

BACKGROUND

A system may spend significant resources on performing actions to achieve a positive result. Such actions are often performed on entities, and the achievement of a positive result often depends on characteristics of those entities. For example, a software update system may spend significant resource on performing a particular update on computing nodes in a data center. Whether an update of a particular computing node is successful depends largely on the characteristics of the computing node, the entity on which the action was performed.

In a system with limited resources and a high likelihood of a negative result, it is critical to minimize the number of actions and, thus, the resources spent on those actions. One way to minimize the number of actions is to accurately predict the result for of the action on entities before performing the action. The prediction of such a result is usually associated with a probability of describing the certainty of attaining the result. The system may then choose to perform actions on some entities for which the result is more likely to be attained, while ignoring other entities for which the result is less likely to be attained. Accordingly, the system has greater efficiency to achieve positive results than by randomly selecting entities on which to perform actions.

However, predicting results for entities is computationally intensive, especially when there is a large number of entities. Each entity, for which the result is unknown, needs to be compared with another entity, for which the result is known. With a large number of entities with unknown results, the permutations of comparisons may grow exponentially. Scaling such computations to millions of entities is significantly strenuous for a computer system performing the determination of probabilities.

Nevertheless, even a significantly strenuous computation may be worth the consumption of computing resources, if the accuracy of the prediction result itself will save significantly more resources. For example, when a new software update is to be deployed to a datacenter containing a large number of heterogeneous computing nodes, the resources would be efficiently spent on deploying the update on a small number of computing nodes and then, deploying the update on those computing nodes of data center that are predicted to have positive results, as long as the predicted results are accurate. An alternative approach of deploying the software update on all computing nodes in the datacenter (perhaps in 1,000's or 10,000's) and monitoring all of those computing nodes performance is very resource intensive. Particularly because the monitoring may uncover that a significant number of nodes are underperforming after the deployment, and the update deployed on the underperforming nodes may need to be rolled back. Such rollbacks will consume significant computational resources and cause major disruption for workloads executing in the datacenter.

Another example for which an accurate prediction of results may save critical resources is the allocation of sales resources to accounts in a business organization. The success of a business organization depends largely on the effectiveness of the organization's sales team. At least one aspect that affects the overall effectiveness of a sales team is the manner in which sales resources—that is, the individual members of the sales team (commonly referred to as sales representatives)—are allocated or assigned to the various customer accounts of the business organization. An accurate prediction of a positive (or negative) result for customer accounts allows the sales resources to be effectively targeted to the appropriate customer accounts and increase the likelihood of becoming a seller of products for the customer represented by the customer account. If the number of customer accounts is several degrees larger than the available sales resources, then the business organization is unable to target each and every account and, even if such methodology is attempted, much of the sales resources may be spent without any tangible result. Accordingly, an accurate prediction of a positive result for a subset of customer accounts based on comparisons of the accounts with unknown results with the known ones would increase the effectiveness of the sales resources.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
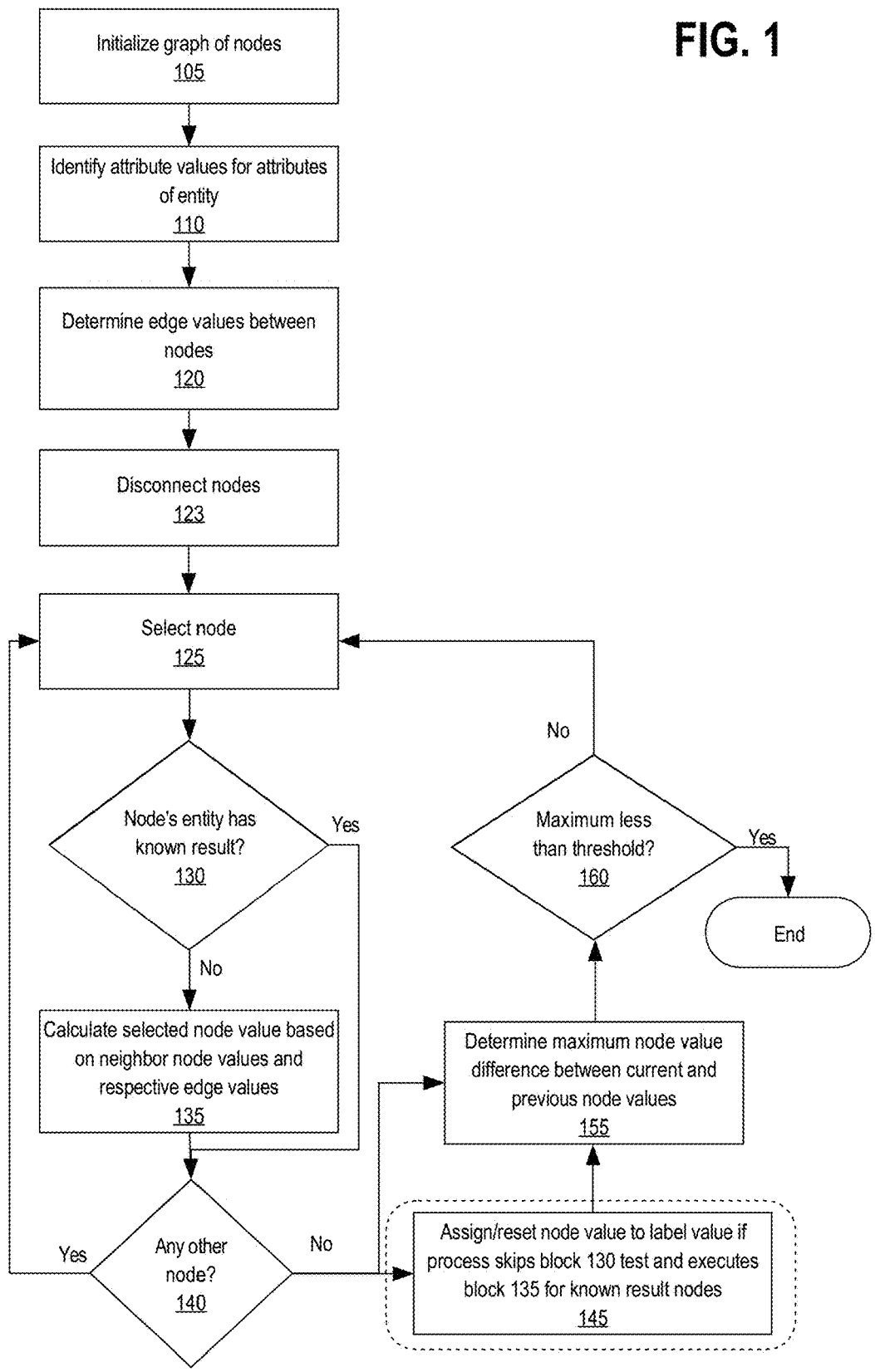
FIG. 1 is a flow diagram that depicts a process for predicting results for entities in a graph of nodes, in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A result of an action on an entity may be predicted, when the result of the same action is known for related entity(s). To find the relatedness between an entity on which the action has already been performed with an entity on which the action has yet to be performed, the entities are compared based on their respective attributes, in an embodiment.

The accuracy of a predicted result for an entity, a computing node or a customer account, varies based on the methodology for predicting results. Particularly, relatedness between attributes may yield that an entity with an unknown result is related to both an entity with a known negative result and an entity with a known positive result. Techniques are described herein to accurately reconcile such results and increase the accuracy of the predicted result.

In an embodiment, to accurately predict a result for an entity, a graph of nodes is generated, in which the entity is represented by a node that is connected to other nodes representing other entities. The nodes in the graph of nodes are assigned values based on known results and unknown results. For convenience, the term "node" and the term "entity" are used interchangeably herein, and, thus, an entity may be simply referred herein as a "node" and vice versa.

The relatedness of the connected entities is described in the graph of nodes by an edge between the connected nodes, in an embodiment. An edge value is determined for each edge and represents a measure of relatedness of the nodes connected through the edge. The edge value of the connected nodes is determined based on the attributes of entities of the connected nodes. Attribute values of a same attribute for the connected nodes are compared, and the edge value is determined based on the comparison. In some embodiments, the lesser the difference between attribute values is, the higher is the edge value and, thus, the measure of relatedness of the connected nodes.

Using the graph of nodes, a predicted result for an unknown result entity is determined using node values and edge values of the connected nodes, in an embodiment. With the knowledge of relatedness, a node value of a node in the graph of nodes is updated based on the propagation of the node values of its connected nodes.

The weight of the propagation for a connected node value depends on the edge value of the edge connecting the node. The higher the edge value, the more influence the connected node has on the node value, in an embodiment. After several iterations of propagation, the node value may converge and the predicted result may be obtained.

Initializing Graph of Nodes

FIG. 1 is a flow diagram that depicts a process for predicting results for entities in a graph, in an embodiment. At block 105, the process initializes the graph of nodes by assigning label values to the nodes in the graph of nodes. The term "label value" refers herein to the numeric representation of the result for an entity. A positive label value is associated with a positive result for an entity and a negative label value is associated with a negative result for an entity. For example, the positive label value has a value of 1, while the negative label value has a value of 0.

Accordingly, the nodes with known results are assigned the positive label value if the result for the node is positive and the negative label value if the result for the node is negative. In an embodiment, the nodes that have unknown result are assigned initially to a negative label value.

Figure 2A:
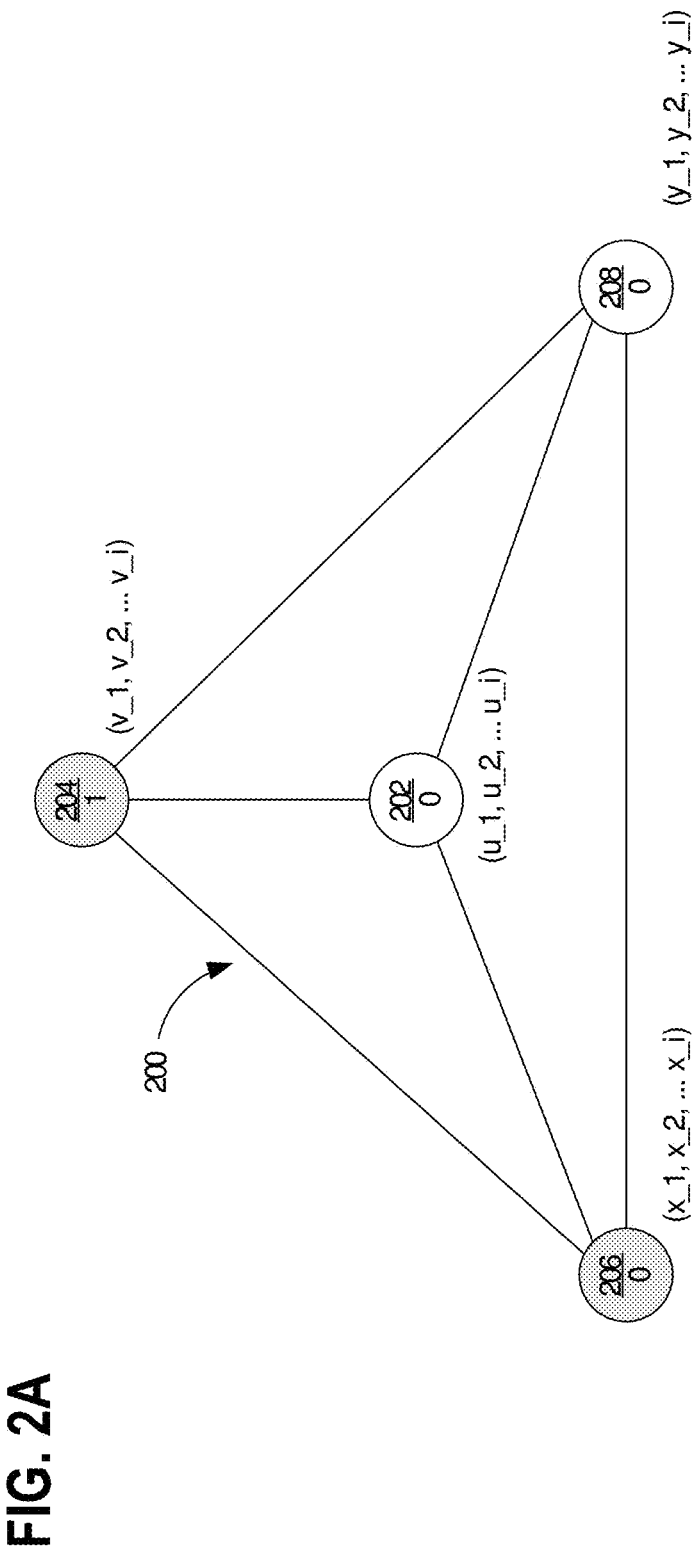
FIG. 2A-F are block diagrams that depict a graph of nodes, in various embodiments.

FIG. 2A is a block diagram that depicts initialized graph of nodes 200, in an embodiment. Shaded nodes 204 and 206 represent entities with known results: node 204 represents an entity with a known positive result and, thus, is assigned the positive label value of 1, while node 206 represents an entity with a known negative result and, thus, is assigned the negative label value of 0. Nodes 202 and 208 represent entities with unknown results and, thus, are initialized to the negative label value of 0.

Additionally or alternatively, at block 105, all nodes in the graph of nodes are initially connected with each other regardless of (and/or before) the determination of relatedness between the nodes. For example in FIG. 2A, the process initially treats all the nodes in graph of nodes 200 as related and initializes nodes 200-206 as connected entities.

In another embodiment, the pairs of nodes that have edge values above a particular threshold are connected after those edge values are calculated using techniques described herein. In such an embodiment, first, the process performs block 120 and then, uses the calculated edge values for determining which nodes are connected in the graph of nodes.

In yet another embodiment, nodes with unknown results are not connected with each other, while nodes with known results are initially connected to all of the nodes with unknown results. Other similar techniques may be envisioned for the initialization of connections among nodes.

Regardless which technique is used for initialization of the graph of nodes, a node in the graph of nodes is connected with at least one other node in the graph of nodes. The node(s) directly connected to a node are referred herein with the term "neighbor node(s)." A node and any or all of its neighbor nodes are referred herein as "neighboring nodes."

Attributes

At block 110 of FIG. 1, to determine relatedness of nodes in the graph of nodes, attribute values of same attributes are identified and compared for pairs of neighboring nodes in the graph of nodes, in an embodiment. The term "attribute" refers to a "dimension" of an entity describing a quality or feature regarded as a characteristic or inherent part of an entity. Respectively, the term "attribute value" of an attribute refers to a numerical measure of the quality or feature of the attribute of an entity.

In an embodiment in which entities represent computer systems, different attributes are identified that characterize different features of a computer system. Non-limiting examples of attributes describing system resources include number of cores; cycles per second of each core; cache size; and system memory size. Such attributes may be readily used for determination of relatedness of computer systems. Similarly, attributes describing workload and performance statistics of a computer system (CPU utilization, memory utilization, I/O throughput) may also be identified for the computer system to characterize the run-time aspects of the computer system represented in the graph of nodes.

In a different embodiment, in which the entities of the graph of nodes represent customer accounts of a seller, different attributes are identified that characterize customer accounts. Non-limiting examples of such attributes include:
  Number of employees that the customer of the customer account has.
  Number of sales representatives that the customer employs.
  Amount spent by the customer on the seller's products.
  Maximum amount projected that the customer can spend on the seller's products determined based on the number of sales representatives of the customer and the historical information about the amount spent by the customer on relevant products.

In a related embodiment, data from a social network application improves the characterization of a customer account by providing additional relevant attributes. Non-limiting examples of the social network based attributes include:
  Number of employees of the customer that are users of an online social network service or application.
  Activity measure of users associated with the customer on the social network service. The measure describes the level of activity of the users on the social network and is based on the number of searches performed within a particular time period, the number of posts and the number of messages sent or received by the users.

Number of connections by the users on the social network service.

Number of connections between (1) the users, of the social network service associated with the customer and (2) the users of the social network service associated with the seller.

Number of followers of the customer on the social network service who are not employees of the customer.

In an embodiment, attribute values of different attributes are normalized for entities in the graph of nodes. Since the attribute values for different attributes of an entity may have different ranges, a determination of relatedness based on one attribute may dominate another attribute. For example, if attribute values for number of employees attribute range from 10 to 10,000, while attribute values for the amount spent attribute range from $0 to $1,000,000, then the differences in the attribute values for the number of employees attribute would generally be smaller, and thus, the number of employees of attribute would be more dominant in comparisons of relatedness for entities than the amount spent attribute.

In an embodiment, attribute values of an attribute are normalized by scaling the attribute values to a particular range based on the maximum and the minimum values of the attribute values. The process determines the maximum and the minimum values of the attribute values of the attribute and uses the maximum and the minimum values to calculate the normalized attribute value. For example, the below equation is used to calculate a normalized attribute value, $u_i$, of ith attribute of node u.

$$u_i = \frac{u'_i - U_{min}}{U_{max} - U_{min}}$$

where $u'_i$ is the non-normalized attribute value for ith attribute of node u and $U_{max}$ is the maximum value for the ith attribute among attribute values of nodes in the graph of nodes, and $U_{min}$ is the respective minimum value.

In other embodiments, another methodology may be used to normalize the attribute values across attributes. The exact methodology used to normalize attribute values is not critical to the techniques described herein.

Calculating Edge Values

Comparing attribute values for one or more attributes determines similarity or difference of nodes with respect to the one or more attributes. In some instances, when multiple attributes are common between neighboring nodes, some attribute values may yield that the neighboring nodes are related, while other attributes may yield that the neighboring nodes are not related.

In an embodiment, attribute values of a pair of neighboring nodes are reconciled by calculating a single edge value for all common attributes of the pair of neighboring nodes. The calculation of the edge value for the pair of neighboring nodes is based on differences in attribute values for the common attributes of the pair of neighboring nodes. Normalized attribute values may be used to avoid any particular attribute having more weight in the edge value calculation.

According to one technique for an edge calculation, attribute values of a node are considered to be coordinates in a multi-dimensional space, where each dimension corresponds to an attribute of the node. For example, in FIG. 2A, node 202 has coordinates $(u_1, u_2, \ldots, u_i)$ corresponding to the attribute values from the first to ith attributes. Similarly, node 204 has coordinates $(v_1, v_2, \ldots, v_i)$ corresponding to the attribute values for the same first to ith attributes. In such a multi-dimensional space, an edge value for a pair of neighboring nodes may be determined based on the distance between the nodes, which is calculated using the coordinates of each node in the multi-dimensional space.

For example, the distance between node 202 and node 204 in graph of nodes 200 of FIG. 2A is calculated using the following equation:

$$D_{u,v} = \sqrt{(u_1-v_1)^2 + (u_2-v_2)^2 + \ldots + (u_i-v_i)^2}$$

In an embodiment, the distance between a pair of neighboring nodes is used to calculate an edge value for the pair of neighboring nodes. The distance between the pair of neighboring nodes is inversely proportional to the relatedness of nodes. The more related the nodes are, the smaller is the value of distance of the nodes, and the less related the nodes are, the greater is the value of distance of the nodes. To have the edge value proportional to the relatedness of the neighboring nodes, the edge value is calculated to be inversely proportional to the distance value, in an embodiment. One non-limiting example of an edge value calculation is the equation below:

$$W_{u,v} = e^{-\sigma D_{u,v}}$$

where $W_{u,v}$ is the edge value for a pair of neighboring nodes, u and v, that have multi-dimensional distance $D_{u,v}$ calculated based on attribute values of the u and v nodes. Since the distance is a negative exponent, the smaller is the distance value, the greater is the edge value and vice versa.

The scaling factor, $\sigma$, in the equation is determined using cross validation. The term "cross validation" with respect to a variable, such as the scaling factor, refers herein to techniques for determining the value of the variable based on re-calculation of predicted results for a sample of entities with known results. The predicted results are calculated each time using a different adjusted value of the variable and are compared with the known results of the same entities. When the desired accuracy for predicted results is achieved, the value of the variable used in the calculation is selected to be the result of cross validation for the variable. Accordingly, using a sample of nodes with known results, the scaling factor is determined using cross validation and used to scale the distance component in the calculation of the edge value between the neighboring nodes, in an embodiment.

Continuing with the flow diagram in FIG. 1, at block 120, edge values are calculated for each pair of neighboring nodes in the graph of nodes. Using the calculated edge value for a pair of neighboring nodes, the process determines the weight for propagating node values between the neighboring nodes. Greater weight allows the neighboring nodes to have greater reciprocal influence on each other's node values.

Disconnecting Nodes

Conversely, with a lesser weight, the neighboring nodes have lesser reciprocal influence on each other's node values. Accordingly, if the edge value for an edge between a node and a neighbor node is small, then the node value calculation for the node is relatively scarcely affected by the neighbor node value.

In an embodiment, to reduce the number of operations for a node value determination, the nodes that are connected by edges with relatively small edge values are disconnected in the graph of nodes at block 123. Once two nodes are disconnected, the nodes are no longer neighboring nodes, and their respective node values do not reciprocally influence each other.

In one embodiment, neighboring nodes are disconnected based on a threshold edge value. For example, if the edge value of the neighboring nodes is less than (or equal to) the threshold edge value, then the previously connected nodes are disconnected. While if the edge value is greater than (or equal to) the threshold edge value, then the nodes stay connected.

In an embodiment, the threshold edge value is determined based on all edge values in the graph of nodes. The edge values may be ranked together, and a threshold edge value may be selected corresponding to a certain bottom percentage of the ranked edge values. The nodes connected with edges having edge values that are below the determined threshold edge value (and thus falling in the certain bottom percentage of the edge values) are disconnected.

Similarly, in another embodiment, a normal distribution of edge values may be assumed, and the threshold edge value is determined based on the certain number of standard deviations below the average edge value for the graph of nodes. Accordingly, the nodes that are connected by the edges with edge values that are below the average edge value by more than certain number of deviations are disconnected.

Figure 2B:
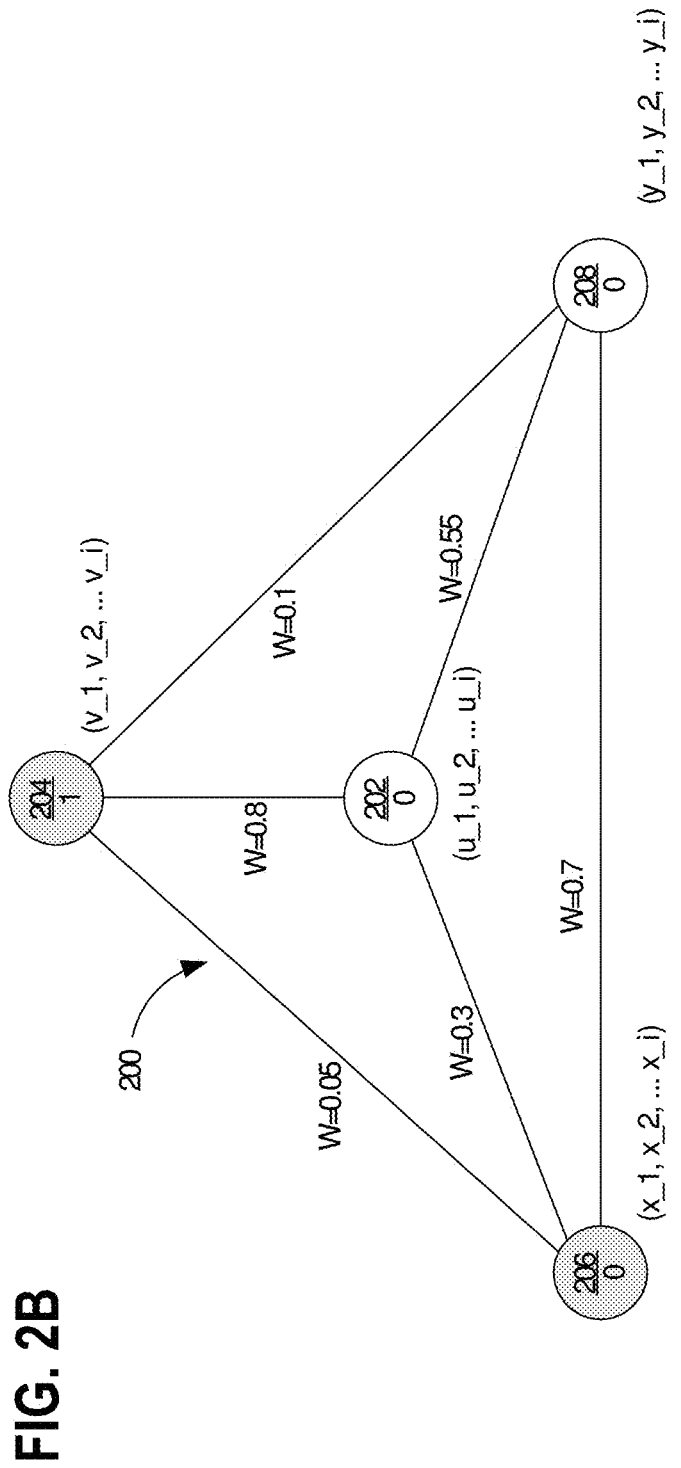
Figure 2C:
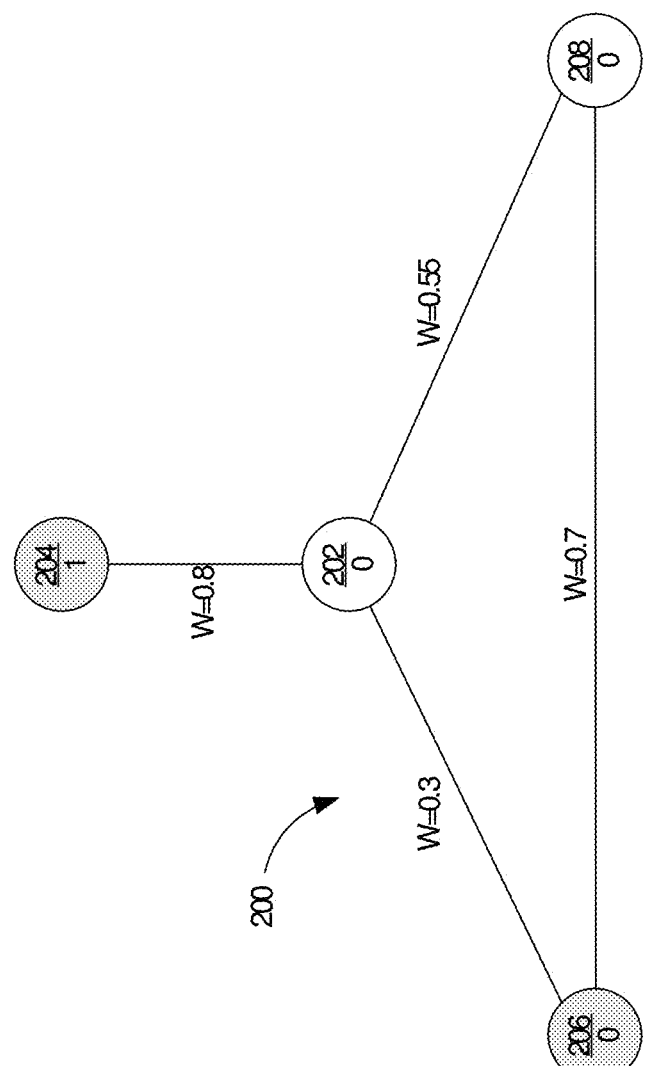

For example, the threshold edge value is determined to be 0.2 for nodes 202-208 in FIG. 2B. Based on the threshold edge value, the edge value of 0.1 between node 204 and node 208 is below the threshold. Similarly, the edge value between nodes 206 and 204, 0.05, is also below the threshold. The rest of the edge values in graph of nodes 200 are above the threshold. FIG. 2C depicts graph of nodes 200, in which the edges with edge values below the threshold edge value are disconnected, and the nodes are arranged based on their distance (inversely proportional to the corresponding edge value).

Determining Node Values

Continuing with the flow diagram of FIG. 1, at block 125, the process selects a node from the graph of nodes and identifies the neighbor nodes of the selected node.

If the selected node has a known result as determined at block 130, then the node value for the selected node is known—either a positive label value for a known positive result, or a negative label value for a known negative result. Thus, no calculation is performed on the selected node, and the process proceeds to block 140 and to select the next node in the graph of nodes.

In another embodiment, regardless whether the selected node has known or unknown result, the node value is calculated for the selected node at block 135. In such an embodiment, the node values for known result nodes are reset to the respective label values corresponding to the known results after each propagation of neighbor node values at block 145. The selected node with a known positive result is reset to a positive label value, while the selected node with a known negative result is reset to a negative label value.

In an embodiment, at block 135, the node value of the selected node is calculated based on the node values of neighbor nodes and the respective edge values with the neighbor nodes. The calculation may use node values of the neighbor nodes from the previous iteration.

The node value of the selected node is calculated by combining the neighbors' node values with weights that correspond to the edge values of the respective edges of the neighbor nodes with the selected node. Stated differently, each neighbor node value is propagated to yield the new node value for the selected node. The weight of the propagation is determined by the edge value of the edge between the neighbor node and the selected node.

In an embodiment, the selected node's new value is calculated using the following equation for node value propagations:

$$S_u = \frac{\Sigma_{v \in u's\ neighbors}(S_v \times W_{u,v})}{S_{max} \times \Sigma_{v \in u's\ neighbors}(W_{u,v})}$$

where $S_u$ is the new node value calculated by adding all neighbor node values S multiplied by the corresponding edge values for the selected node, $W_{u,v}$, and divided by the maximum possible value that could be propagated to the new node value. The maximum possible value propagated is the positive label value, $S_{max}$, multiplied by the summation of all edge values, $W_{u,v}$ (as if all neighbor node values have positive label value). In the embodiments, in which the positive label value is equated to 1 ($S_{max}=1$), the summation of all neighbor node value propagations is divided by the summation of all the edge values for the selected node.

FIG. 2C, depicts an example of a selected node and the neighbor nodes of the selected node in graph of nodes 200, in an embodiment. Node 202 has been selected and is connected with node 204-208. Accordingly, nodes 204-208 are neighbor nodes which node values are to be propagated to node 202 with weights corresponding to the edge values.

At block 140 of FIG. 1, the process determines whether all nodes have been selected at block 125 in the current iteration. Blocks 125-140 are repeated until nodes for at least all entities with unknown result, are selected at block 125. In some embodiments, node values for all nodes in the graph of nodes are calculated at blocks 125-140 including the nodes with known results. In such embodiments, at block 145, the nodes with known results are reset to their original label value as previously discussed.

Figure 2D:
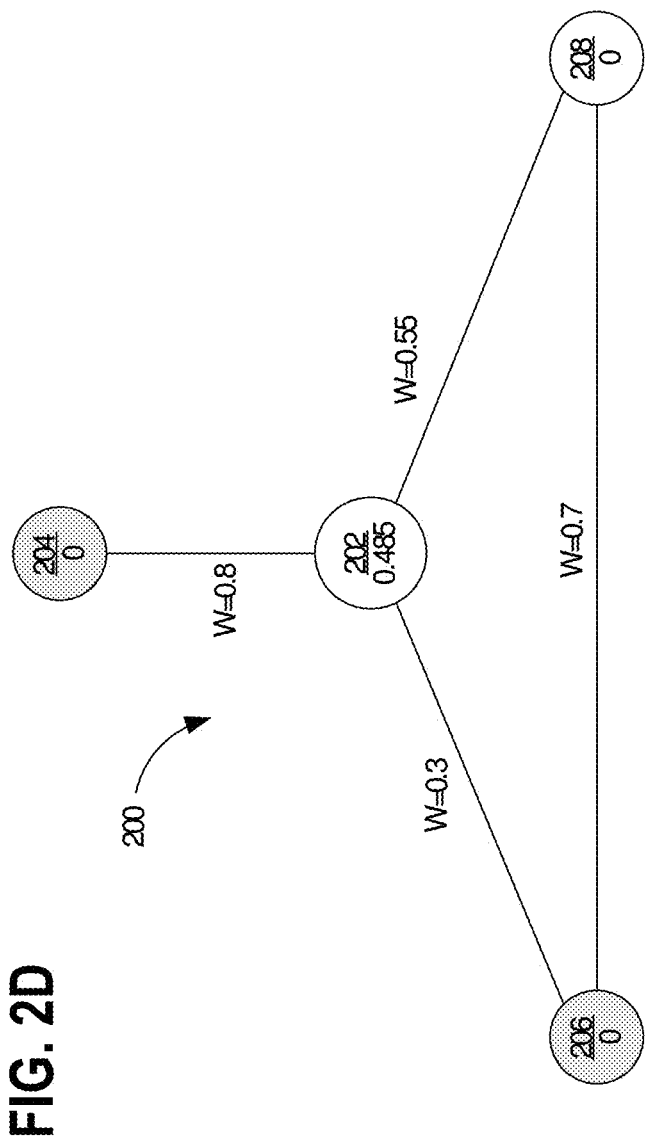
Figure 2E:
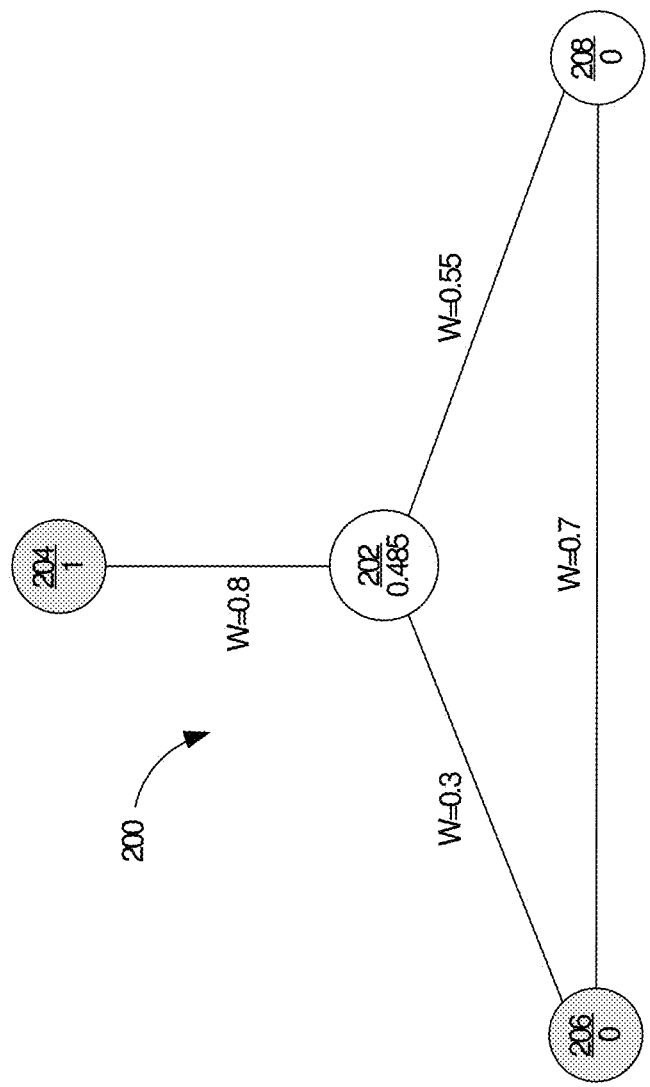

For example, as a result of another iteration and execution of blocks 125-140, node values depicted in FIG. 2C for graph of nodes 200 are modified as depicted in FIG. 2D. Since all node values in graph of nodes 200, including those with known results, have been recalculated as depicted in FIG. 2D, node 204, although representing an entity with a known positive result, was calculated to have a node value of 0. However, after the process executes block 140, node 204 is reset to a label value of 1 corresponding to the known positive result for the entity as depicted in FIG. 2E. On the other hand, in graph of nodes 200 of FIGS. 2D and 2E after the execution of blocks 125-140, node 202 that has an unknown result, has been calculated to be 0.485, while node 208 has been calculated to have a node value of 0.

Iterative Calculation of Node Values

In an embodiment, a node value in the graph of nodes is calculated iteratively. In each iteration, the calculation of the node value may yield a different result because the neighboring node values used in the calculation may have changed since the last calculation in the last iteration.

For example, based on the calculation of the node values of graph of nodes 200, the node values have changed from those depicted in FIG. 2C before the calculation to those depicted in graph of nodes 200 in FIG. 2E after the calculation. Particularly, node 202 has changed from having a value of 0 to having a value of 0.485.

Figure 2F:
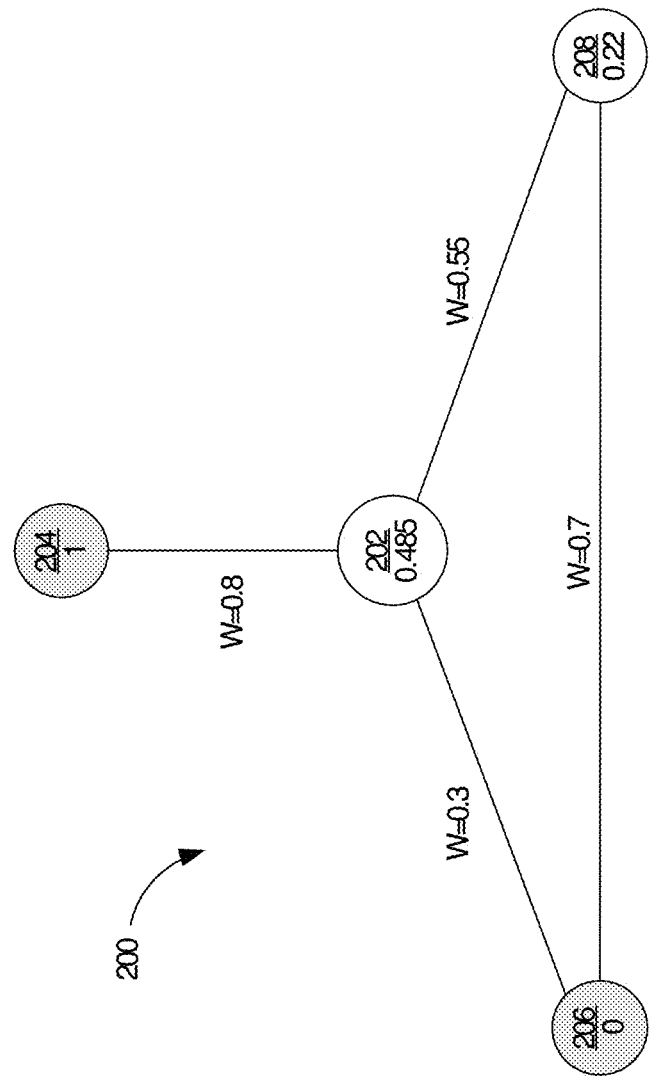

Because the node 202's value has changed in FIG. 2E, next time the neighboring node values are calculated their respective values may change as well. For example in FIG. 2F, node 208 has a new value of 0.22 compared to the previous value of 0 depicted in FIG. 2E. (Note that node 208 is the only value that has changed from one iteration result depicted in FIG. 2E to the other iteration result depicted in FIG. 2F.) The difference in the node value is due to the change of the node 202's value in the previous iteration of the calculations.

In an embodiment, a new node value of a node in the graph of node is calculated based on the node values of neighbor nodes determined in the previous iteration. Stated differently, a newly calculated node value is not used to calculate the node values of the newly calculated node's neighbors. Rather, when a node in the graph of nodes is selected for the node value calculation, the node value is calculated based on the node's neighbors' previous iteration node values.

After iterations of calculations of node values in the graph of nodes, the calculated node values of different iterations for a same node converge, in an embodiment. A maximum deviation threshold is selected to determine whether a convergence of node values have occurred between the different iterations for the nodes in the graph of nodes.

At block 155, after one or more iterations, the differences of node values for nodes in the graph of nodes between iterations are compared. Based on the comparison, the process selects a node with a node value that has changed the most between the iterations. The node's node value is denoted as the maximum difference for the graph of nodes. At block 160, the maximum difference is compared to the maximum deviation threshold. If the maximum difference is lesser (and/or equal), then the process determines that the convergence has occurred. Otherwise, the process may determine that at least another iteration of node value calculations is necessary, and the process proceeds to block 125 to select a node for a node value calculation.

In another embodiment (not depicted in FIG. 1), the process may perform a predetermined number of iterations and assume that a convergence has occurred after those iterations. In yet another embodiment, a combination of the predetermined number of iterations and the maximum deviation threshold is used to determine that node values in the graph of nodes have converged after the iterations.

In an embodiment, once the process has determined that a convergence has occurred, the process may rank the nodes and, thus, the corresponding entities, and assign rank values based on the respective node values. The ranking values are assigned to entities in the graph of nodes in such a way as to arrange the entities from those likely to yield a positive result to those likely to yield a negative result. A higher rank value denotes greater chance that the entity assigned the high rank value will have a positive result.

In an embodiment, the ranked entities along with their rank values and/or the converged node values are displayed/provided to a user, a person or a client computer system. Based on the rank and/or the predicted result, the user may decide whether to pursue a particular entity to achieve a desired result.

In an example in which entities are sale accounts, the sales accounts are assigned sequential ranking values based on their respective node values arranged in a descending order. Based on the ranking values, the user may determine to first pursue sales accounts with higher ranking values that have possibly higher likelihood of a positive result. In a resource constraint environment with many potential sales accounts, the user may determine to pursue sales accounts with corresponding rank values and/or node values in a certain top percentile of the respective values.

In an example in which entities are computing nodes in a datacenter, the computing nodes are similarly ranked and those with respective higher rank values/higher node values are selected for the software deployment. Deploying the software on the higher rank value/high node value computing nodes maximizes the likelihood for a successful data center deployment.

In an embodiment, the entities of the graph of nodes are displayed to a user on a graphical user interface (GUI). The entity name and/or node value of a node is displayed in the GUI graph of nodes. The GUI graph of nodes may further include graphical representations of nodes and/or the edges between the nodes in the graph of nodes. The distance between the nodes in the GUI graph of nodes may correspond to the calculated distance between the nodes in the graph of nodes. Accordingly, the GUI graph of nodes may intuitively represent to the user the underlying reasons for a particular predicted result for an entity in the graph of nodes by the depiction of the entity's closeness or remoteness from the known result entities in the graph. The GUI may also allow a user to select a node or an edge to cause attributes values of the node and its neighboring node(s) to be displayed to allow the user to see how the respective entities differ and/or are similar.

Combining Classifiers

In an embodiment, various classifiers are used to adjust predicted results generated based on graph-based techniques described herein. The term "classifier" refers to a non-graph based technique for predicting results for a set of entities. Examples of non-graph based techniques include techniques using logistic regression and random forest. In addition to determining a node value (referred herein as "propagated node value") for a set of entities in the graph of nodes using a graph-based technique, results based on various classifiers may be used.

The various classifiers-based predicted results for an entity may be combined to represent a combined classifier-based predicted result for the entity. In an embodiment, each classifier may have a different weight associated with the classifiers. For example, a logistic regression classifier may be given a greater weight than a random forest classifier, or vice versa.

In an embodiment, the combined classifier-based predicted result for entity u, $C_u$, is represented by the following equation:

$$C_u = \Sigma \beta_i * y_{u,i}$$

where $y_{u,i}$ is the ith classifier-based predicted result for entity u with a corresponding weight, $\beta_i$. The corresponding weight of $\beta_i$, is determined using cross validation.

The combined classifier-based predicted result of an entity may be further combined with the propagated node value of the entity to further adjust the node value and, thus, a final predicted result for the entity. In an embodiment, a propagated node value is combined with a corresponding combined classifier-based result of the node using weights. For example, the new node value for entity u may be calculated based on the following equation:

$$S'_u = \gamma \times s_u + \alpha \times C_u$$

where $S_u$ is the propagated node value for node u, $C_u$ is the combined classifier-based result for entity u, and γ and α are the respective weights. The respective weights, γ and α, may be determined using cross validation.

In a related embodiment, γ, the weight of a propagated node value, is inversely dependent on the weight for the combined classifier-based result, α, for a node. Accordingly, the greater is the determined weight for the combined classifier-based result, the lesser is the weight for the propagated node value or vice versa. In such an embodiment, the new node value and, thus, the predicted result for the node is represented using the following equation:

$$S'_u = (1-\alpha) \times S_u + \alpha \times C_u$$

where the weight for the combined classifier-based result, α, and, thus, the weight for the propagated node value may be determined using cross validation.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
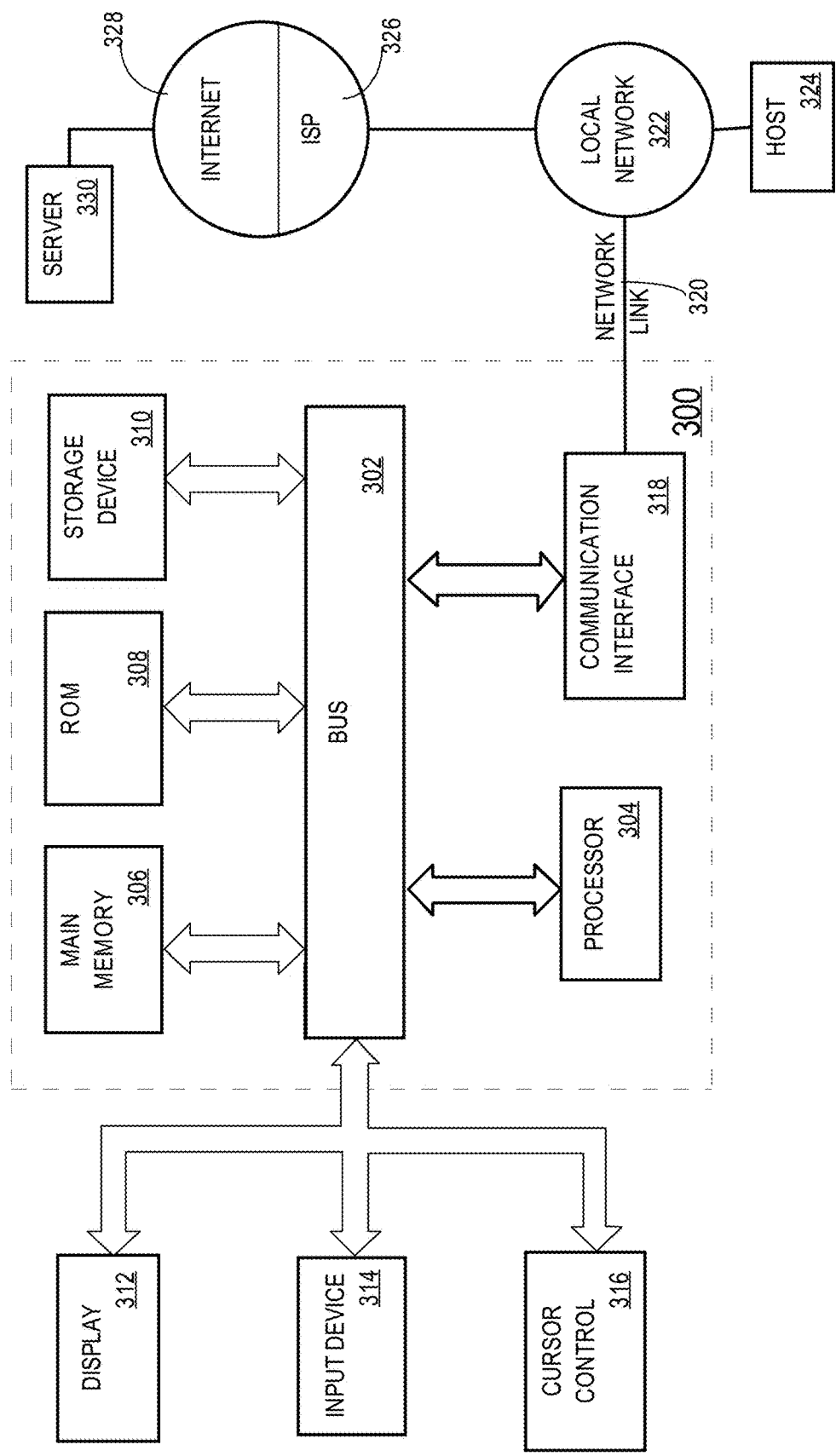
FIG. 3 is a block diagram that illustrates a computer system upon which an embodiment of the invention may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-method comprising:
   for each entity of a plurality of entities, identifying a respective plurality of attribute values;
   generating a graph of nodes that comprises a plurality of nodes and a plurality of edges, wherein each node in the plurality of nodes represents a respective entity of the plurality of entities and is connected to one or more neighbor nodes with one or more edges of the plurality of edges;
   for each edge of the plurality of edges:
      determining that a first node is connected to a second node by said each edge;
      identifying a first set of attribute values of a first entity, of the plurality of entities, that is represented by the first node;
      identifying a second set of attribute values of a second entity, of the plurality of entities, that is represented by the second node;
      calculating an edge value for said each edge based on the first set of attribute values and the second set of attribute values;
   for each node of the plurality of nodes:
      calculating a node value of said each node based on one or more node values of the one or more neighbor nodes of said each node and one or more edge values of the one or more edges with which said each node is associated; and
      storing the node value of said each node in association with the respective entity that is represented by said each node.

2. The method of claim 1, further comprising, prior to calculating:
   assigning, to a node value of each first node in a first subset of the plurality of nodes, a positive label value that indicates a positive label of a respective first entity associated with said each first node in the first subset;
   assigning, to a node value of each second node in a second subset of the plurality of nodes, a negative label value that indicates a negative or unknown label of a respective second entity associated with said each second node in the second subset.

3. The method of claim 1, further comprising, for each iteration in a plurality of iterations, calculating, for each node in the plurality of nodes a new node value based on the one or more edge values and one or more previous node values, associated with the one or more neighbor nodes, determined at a previous iteration.

4. The method of claim 3, further comprising terminating the plurality of iterations when a maximum of differences between calculated new node values at an iteration and corresponding node values at a particular previous iteration is less than a particular threshold value.

5. The method of claim 3, after said each iteration but before next iteration:
   to a node value of each first node in a first subset of the plurality of nodes, assigning a positive label value that indicates a positive label of a respective first entity associated with said each node in the first subset;
   to a node value of each second node in a second subset of the plurality of nodes, assigning a negative label value that indicates a negative label of a respective second entity associated with said each node in the second subset.

6. The method of claim 1, further comprising disconnecting a particular neighbor node of said one or more neighbor nodes when an edge value for an edge connecting said each node with the particular neighbor node is less than a threshold edge value.

7. The method of claim 1, wherein the plurality of attributes values correspond to a plurality of attributes that includes a particular attribute, the method further comprising:
   for the plurality of entities, identifying a plurality of original attribute values that correspond to the particular attribute;
   determining a maximum original attribute value and a minimum original attribute value from the plurality of original attribute values;
   for each entity of the plurality of entities, calculating an attribute value for the particular attribute based on the maximum original attribute value, the minimum original attribute value, and an original attribute value, of the plurality of original attribute values, that is associated with said each entity.

8. The method of claim 1, wherein calculating the node value of said each node is further based on a special value of a particular classifier for the respective entity.

9. The method of claim 8, wherein the particular classifier is determined using a regression.

10. The method of claim 8, further comprising:
calculating a propagation value based on the one or more node values of the one or more neighbor nodes and the one or more edge values;
calculating the node value of said each node based on the special value weighted with a first weight value and based on the propagation value weighted with a second weight value.

11. The method of claim 10, wherein the first weight value depends on the second weight value.

12. The method of claim 1, further comprising assigning a rank value to the respective entity of said each node based on comparison of the node value, of said each node, to node values of other nodes in the plurality of nodes.

13. The method of claim 1, further comprising:
displaying the graph of nodes to a user that includes displaying, for each particular node in the graph of nodes:
a particular node value of said each particular node in the graph of nodes,
a particular entity associated with said each particular node in the graph of nodes, and
connections to one or more particular neighbor nodes associated with said each particular node in the graph of nodes.

14. A system comprising:
one or more processors;
one or more storage media storing instructions which, when executed by the one or more processors, cause performing of a method comprising:
for each entity of a plurality of entities, identifying a respective plurality of attribute values;
generating a graph of nodes that comprises a plurality of nodes and a plurality of edges, each node in the plurality of nodes represents a respective entity of the plurality of entities and is connected to one or more neighbor nodes with one or more edges of the plurality of edges;
for each edge of the plurality of edges:
determining that a first node is connected to a second node by said each edge;
identifying a first set of attribute values of a first entity, of the plurality of entities, that is represented by the first node;
identifying a second set of attribute values of a second entity, of the plurality of entities, that is represented by the second node;
calculating an edge value for said each edge based on the first set of attribute values, and the second set of attribute values;
for each node of the plurality of nodes:
calculating a node value of said each node based on one or more node values of the one or more neighbor nodes of said each node and one or more edge values of the one or more edges with which said each node is associated; and
storing the node value of said each node in association with the responsive entity that is represented by said each node.

15. The system of claim 14, wherein the method further comprises, prior to calculating:
assigning, to a node value of each first node in a first subset of the plurality of nodes, a positive label value that indicates a positive label of a respective first entity associated with said each first node in the first subset;
assigning, to a node value of each second node in a second subset of the plurality of nodes, a negative label value that indicates a negative or unknown label of a respective second entity associated with said each second node in the second subset.

16. The system of claim 14, wherein the method further comprises, for each iteration in a plurality of iterations, calculating, for each node in the plurality of nodes a new node value based on the one or more edge values and one or more previous node values, associated with the one or more neighbor nodes, determined at a previous iteration.

17. The system of claim 16, wherein the method further comprises terminating the plurality of iterations when a maximum of differences between calculated new node values at an iteration and corresponding node values at a particular previous iteration is less than a particular threshold value.

18. The system of claim 16, wherein the method further comprises after said each iteration but before next iteration:
to a node value of each first node in a first subset of the plurality of nodes, assigning a positive label value that indicates a positive label of a respective first entity associated with said each node in the first subset;
to a node value of each second node in a second subset of the plurality of nodes, assigning a negative label value that indicates a negative label of a respective second entity associated with said each node in the second subset.

19. The system of claim 14, wherein the method further comprises disconnecting a particular neighbor node of said one or more neighbor nodes when an edge value for an edge connecting said each node with the particular neighbor node is less than a threshold edge value.

20. The system of claim 14, wherein the plurality of attributes values correspond to a plurality of attributes that includes a particular attribute, the method further comprising:
for the plurality of entities, identifying a plurality of original attribute values that correspond to the particular attribute;
determining a maximum original attribute value and a minimum original attribute value from the plurality of original attribute values;
for each entity of the plurality of entities, calculating an attribute value for the particular attribute based on the maximum original attribute value, the minimum original attribute value, and an original attribute value, of the plurality of original attribute values, that is associated with said each entity.

21. The system of claim 14, wherein calculating the node value of said each node is further based on a special value of a particular classifier for the respective entity.

22. The system of claim 21, wherein the particular classifier is determined using a regression.

23. The system of claim 21, wherein the method further comprises:
calculating a propagation value based on the one or more node values of the one or more neighbor nodes and the one or more edge values;
calculating the node value of said each node based on the special value weighted with a first weight value and based on the propagation value weighted with a second weight value.

24. The system of claim 23, wherein the first weight value depends on the second weight value.

25. The system of claim 14, wherein the method further comprises assigning a rank value to the respective entity of said each node based on comparison of the node value, of said each node, to node values of other nodes in the plurality of nodes.

26. The system of claim 14, wherein the method further comprises:
- displaying the graph of nodes to a user that includes displaying, for each particular node in the graph of nodes:
  - a particular node value of said each particular node in the graph of nodes,
  - a particular entity associated with said each particular node in the graph of nodes, and
- connections to one or more particular neighbor nodes associated with said each particular node in the graph of nodes.

* * * * *

UNITED STATES PATENT AND TRADEMARK OFFICE
CERTIFICATE OF CORRECTION

PATENT NO. : 10,387,788 B2
APPLICATION NO. : 15/046708
DATED : August 20, 2019
INVENTOR(S) : Qiang Zhu et al.

Page 1 of 1

It is certified that error appears in the above-identified patent and that said Letters Patent is hereby corrected as shown below:

In the Claims

Claim 14, Column 15 Line 64 replace "responsive" with --respective--.

Signed and Sealed this
Third Day of December, 2019

Andrei Iancu
*Director of the United States Patent and Trademark Office*